United States Patent
Huibers

(12) 
(10) Patent No.: US 8,577,292 B2
(45) Date of Patent: Nov. 5, 2013

(54) BUMP VALIDATION

(75) Inventor: Andrew G Huibers, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 12/699,692

(22) Filed: Feb. 3, 2010

(65) Prior Publication Data

US 2011/0191823 A1     Aug. 4, 2011

(51) Int. Cl.
*H04B 7/00*     (2006.01)

(52) U.S. Cl.
USPC ....... 455/41.2; 455/456.3; 455/557; 455/517; 455/70; 455/115.3; 340/4.2; 340/3.1; 340/3.2; 340/669; 370/912; 710/58

(58) Field of Classification Search
USPC ............ 455/41.2, 456.3, 557, 517, 70, 115.3; 370/4.2, 3.1, 3.2, 669, 10.42, 912; 710/58
See application file for complete search history.

(56) References Cited

U.S. PATENT DOCUMENTS

| | | | |
|---|---|---|---|
| 7,027,836 B2 | 4/2006 | Zacks et al. | |
| 7,427,926 B2* | 9/2008 | Sinclair et al. | 340/4.2 |
| 7,542,770 B2* | 6/2009 | Zegelin | 455/456.3 |
| 7,769,927 B2* | 8/2010 | Dubs et al. | 710/58 |
| 2004/0192383 A1* | 9/2004 | Zacks et al. | 455/557 |
| 2004/0203381 A1* | 10/2004 | Cahn et al. | 455/41.2 |
| 2009/0153342 A1* | 6/2009 | Thorn | 340/669 |
| 2010/0040029 A1* | 2/2010 | Doppler et al. | 370/338 |
| 2011/0076941 A1* | 3/2011 | Taveau et al. | 455/41.1 |
| 2011/0076942 A1* | 3/2011 | Taveau et al. | 455/41.1 |
| 2011/0126009 A1* | 5/2011 | Camp et al. | 713/168 |

* cited by examiner

*Primary Examiner* — April G Gonzales

(74) *Attorney, Agent, or Firm* — Troutman Sanders LLP; James E. Schutz

(57) ABSTRACT

A "bump" occurs when two devices at the same place at the same time indicate their intention to establish a connection for transferring information. A process for validating bumps is described.

22 Claims, 20 Drawing Sheets

S may now deduce that:
"23" on D's clock lies in the range [45, 58] on S's clock.

BUMP VALIDATION

TECHNICAL FIELD

The disclosure is generally related to the field of information exchange between portable electronic devices.

BACKGROUND

Few things are more widespread than cell phones. According to Ericsson, the world's largest maker of telecom network gear, in 2009 about 3.6 billion people had mobile phones. That number is growing rapidly. Unfortunately, exchanging information stored in mobile phones when two such devices meet is tedious. Consider sending an email or short message service (SMS) message from one phone to another. First one must ask the owner of the other device for an address; then a message has to be composed and sent. There is too much overhead in this process, especially for canned messages such as one's contact information or a favorite photo.

What is needed is a simple and quick way to exchange information between electronic devices when they physically meet each other. Further, what is needed is a robust method to validate physical meetings of devices so that information is transferred only when intended and only to the intended recipient.

DETAILED DESCRIPTION

A "bump" occurs when two devices at the same place at the same time indicate their intention to establish a connection for transferring information. The meaning of "the same place" (or "collocated") and "the same time" (or "coincident") is the subject of much of the following description. Intention to establish a connection is signaled by a request that is part of a status report sent by a device to a server.

A bump may be initiated by contact between devices, a simultaneous gesture, button press, voice command, etc. A valid bump is intended by both parties and connects the correct parties. Bump validation is the process of confirming valid bumps or preventing bumps between parties when one or both parties do not intend to bump.

A system for transferring information between devices when they meet (e.g. cell phones carried by people meeting each other) must be fast, accurate and fail-safe to inspire confidence among its users. High quality bump validation is thus a key part of such a system.

Figure 1:
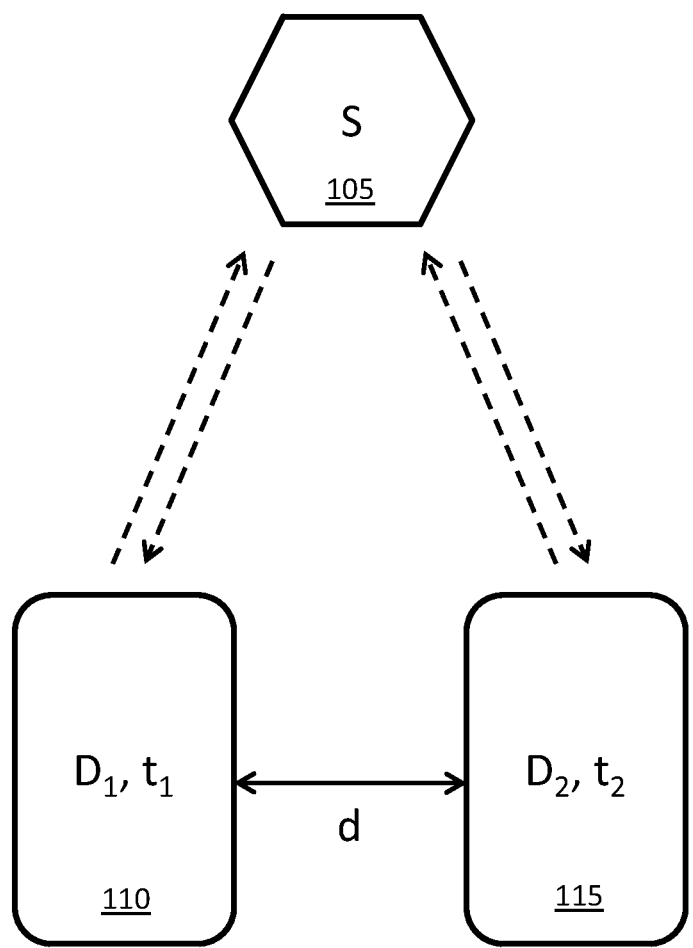
FIG. 1 shows a schematic diagram of communications during a bump.

FIG. 1 shows a schematic diagram of communications during a bump. In FIG. 1, server S 105 is in communication with devices $D_1$ 110 and $D_2$ 115. The devices send status reports to the server. The server uses information in the status reports to determine whether or not a valid bump has occurred. For example, the server uses position and time parts of status reports to determine if the devices were at the same place at the same time. In the event of a valid bump, the server informs the devices and sets up a transfer of information between devices. In the event of an invalid bump, the server informs the devices but does not establish a transfer of information between them. Transfer of information between devices may occur through the server, through another intermediary, or directly between devices.

Figure 2:
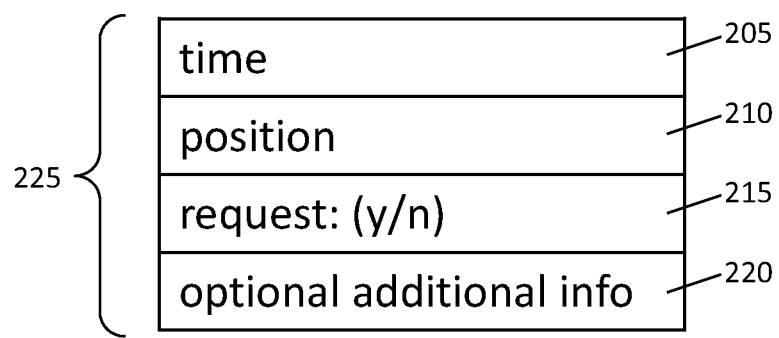
FIG. 2 shows elements of a status report.

FIG. 2 shows elements of status report 225 which includes a time 205, position 210, request 215, and optional additional information 220. The time of a status report is the time the report is sent from the device to the server as measured by the device's clock. (Any delay between creating a report in a device and sending it from the device is treated as if it were part of the overall transmission delay between device and server.) The position of a status report is the position of the device at the time of the report as estimated by one or more methods. The request of a status report is an indication (e.g. "yes" or "no"; "1" or "0"; etc.) of whether or not the device intends to establish a connection. A device determines whether to send a positive ("yes", "1", etc.) or negative ("no", "0", etc.) request based on the results of sensor signal processing: Did the device experience a shock or acceleration? Did it detect a certain noise? Was a button pressed? Et cetera. Optional additional information of a status report may include any number of parameters such as the ambient light, temperature, sound, user identification, power source, credit card number, etc.

Figure 3:
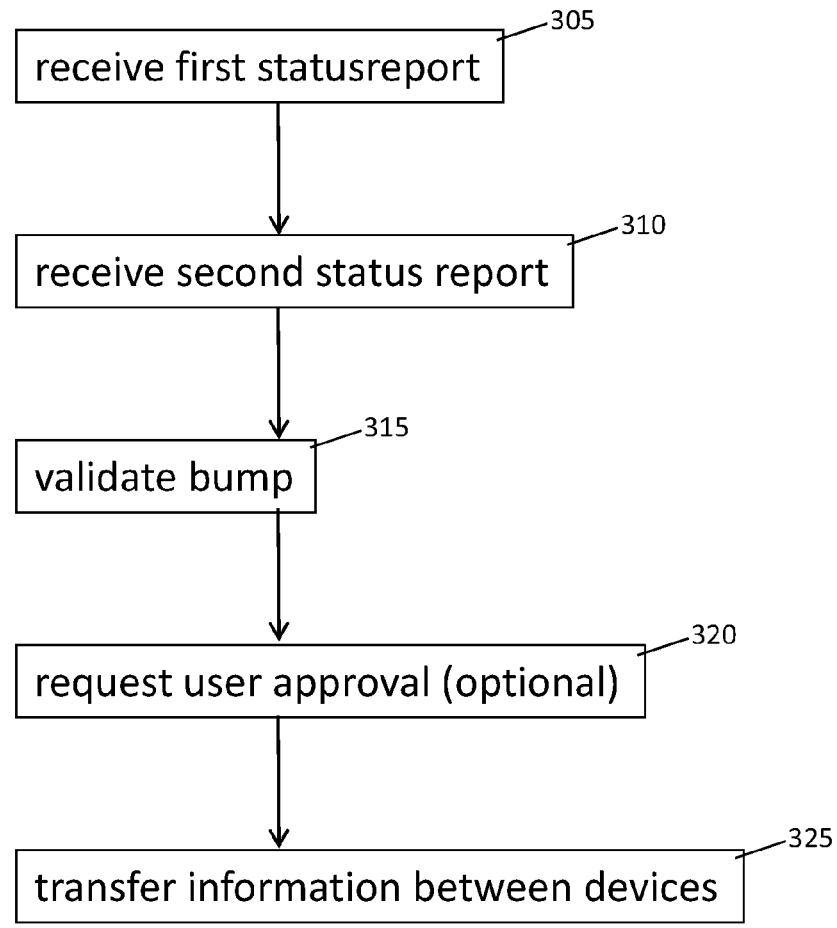
FIG. 3 is a flow chart for establishing information transfer between devices.

FIG. 3 is a flow chart for establishing information transfer between devices. In FIG. 3, step 305 is "receive first status report"; step 310 is "receive second status report"; step 315 is "validate bump"; step 320 is "request user approval (optional)"; and, step 325 is "transfer information between devices". In steps 305 and 310 status reports are received from two devices. Normally a server receives status reports from devices, but it is also possible that the server itself is one of the devices. As discussed in detail below, the server may also receive status reports from other devices. In step 315, the server validates a bump between devices by determining if they were at the same place at the same time and if they intended to establish a connection for transferring information. If a valid bump has occurred, the devices may request user approval in optional step 325. If a valid bump has not occurred, then steps 320 and 325 are not performed; a message may be sent to the devices informing them of failure to complete a valid bump. Finally, if a valid bump has occurred (and optionally been approved by device users) then information is transferred between devices in step 325.

Let us now take a more detailed look at the problem of determining whether or not two devices were at the same place at the same time, and, indeed, what is meant by "the same place" and "the same time". The need for a detailed discussion of these issues comes from limitations in typical devices' ability to estimate position and time. Position and time estimates range from spot-on to wildly inaccurate.

There is always some uncertainty in a position estimate. For bump validation a position estimate may be determined by any of several methods and need not necessarily include coordinates such as latitude, longitude and altitude. Sometimes other indications, for example an identifier specifying a network node with which a device is communicating, may be sufficient. Although an estimate of absolute position is useful for some applications, bump validation may also proceed based on an estimate of relative position of two devices. It is often sufficient to determine that two devices are in the same place without knowing exactly where that place is.

Position estimates may come from global navigational satellite system (GNSS) receivers, of which global positioning system (GPS) receivers are the most common example. Position may be estimated by, and provided as a service of, a cellular radio network such as an EDGE or 3G network. Relative position may be estimated by environmental parameters (e.g. temperature, light, sound, etc.) near devices and determining whether or not such parameters reported by two different devices match. Further, a device may send out a short-range audio or optical message that, if received by another device, indicates two devices are close to each other. Absolute and/or relative position estimates may also be obtained by combining estimates from two or more sources.

Given position estimates for two devices, and the uncertainties in those estimates, one may decide whether or not to consider the two devices "at the same place". Given a position estimate and position uncertainty for a third device, one may decide whether or not that device is "nearby". The accuracy or acceptable position uncertainty may depend on what the position estimate is used for: "same place" and "nearby" may have different accuracy requirements.

Figure 4:
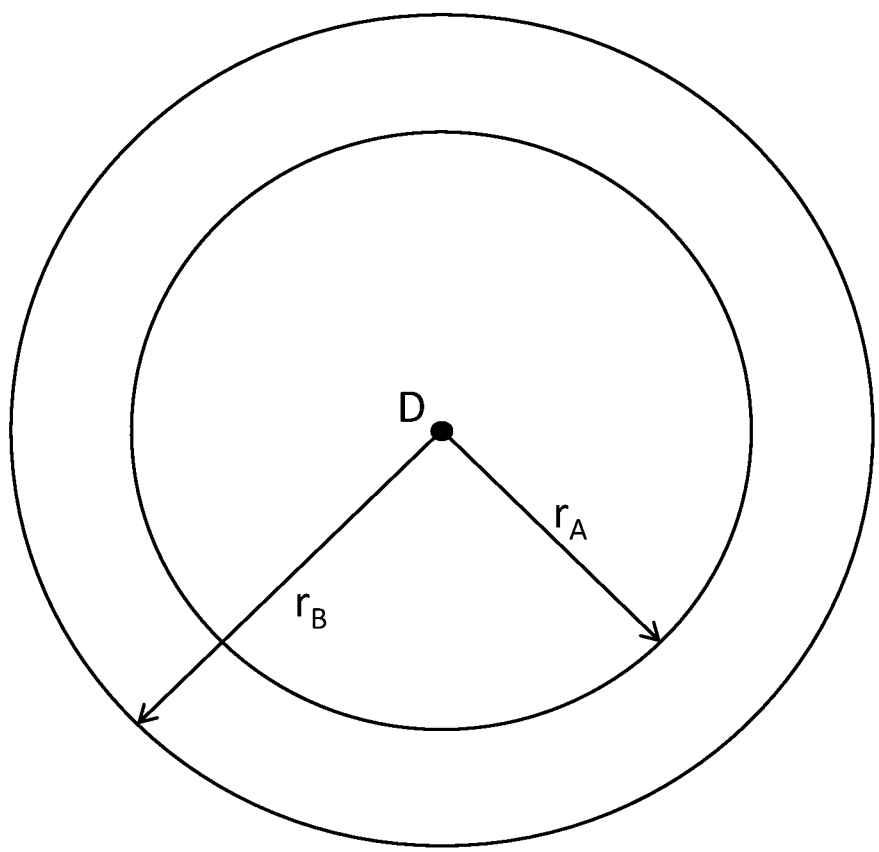
FIG. 4 shows position uncertainty radii for a mobile device, D.

FIG. 4 shows position uncertainty radii for a mobile device, D. Position uncertainty radii, such as radius $r_A$ and radius $r_B$ in FIG. 4, are one way to model position uncertainty. Position uncertainty radii may have many different meanings and uses. They may represent confidence in a position estimate. For example, one may have 67% confidence that a device lies within radius $r_A$ and 95% confidence that it lies within radius $r_B$. Alternatively, position uncertainly radii may depend on the source of a position estimate. The radius for a GPS derived position may be smaller than that for a cellular radio network provided position, for example. Position radii may differ depending on the use of the position estimate. The radius of a position estimate used to validate a bump may be smaller than that used to invalidate a bump, for example. The use of position radii may depend on the application of a bump and/or the density of nearby devices. Higher confidence estimates may be needed for financial transactions than for social connections, for example. Finally, the concept of position uncertainty radius may be extended to non-symmetric uncertainty boundaries. A GPS signal received in an urban canyon environment may indicate that a device is outdoors or near the edge of a building rather than in the center of a building, for example.

Figure 5:
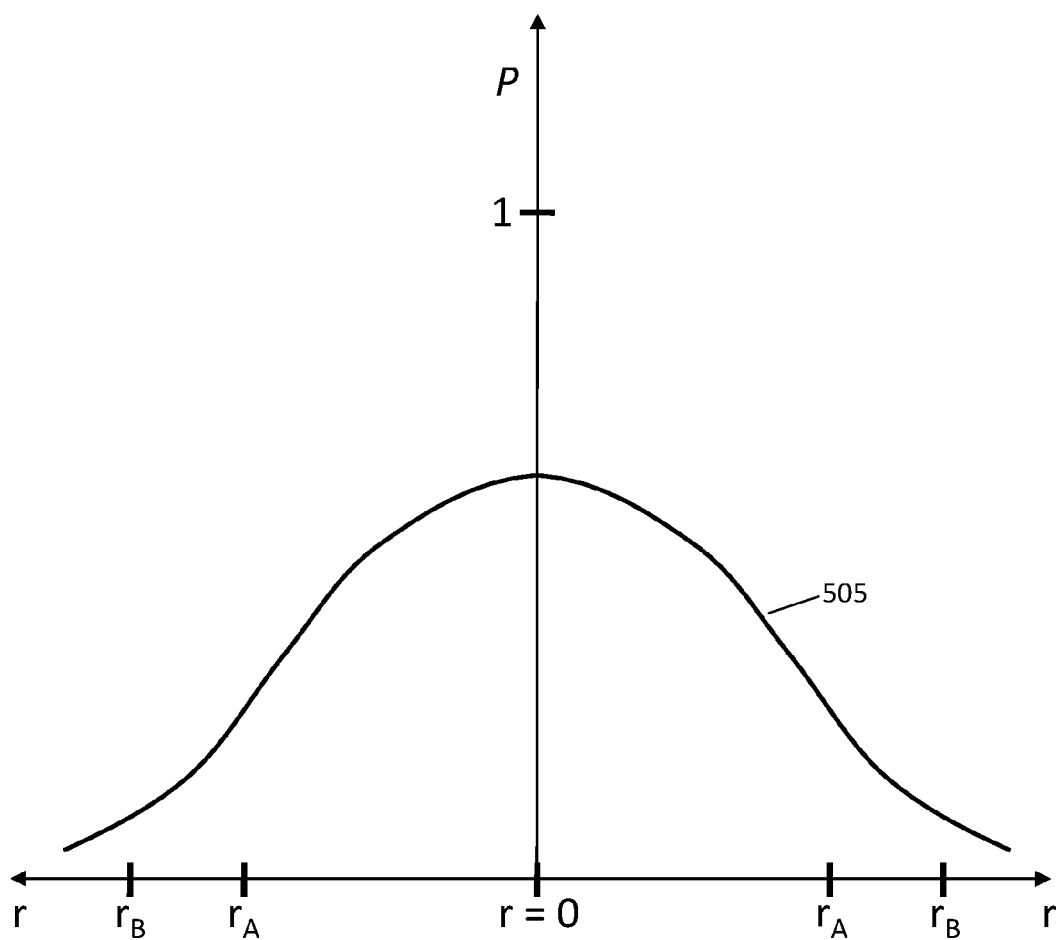
FIG. 5 shows position uncertainty radii for a mobile device.

FIG. 5 shows position uncertainty radii for a mobile device in a different way compared to FIG. 4. In FIG. 5, curve 505 represents the probability of finding a device versus distance from an estimated position, r=0. In this example position uncertainty radii $r_A$ and $r_B$ represent limits of 67% and 95% confidence that a device lies closer to r=0 than $r_A$ or $r_B$ respectively. Said another way, the integrated probability under curve 505 within a distance $r_A$ from the origin is 67%. The shape of curve 505 is not necessarily Gaussian and may even be anisotropic.

Figure 6:
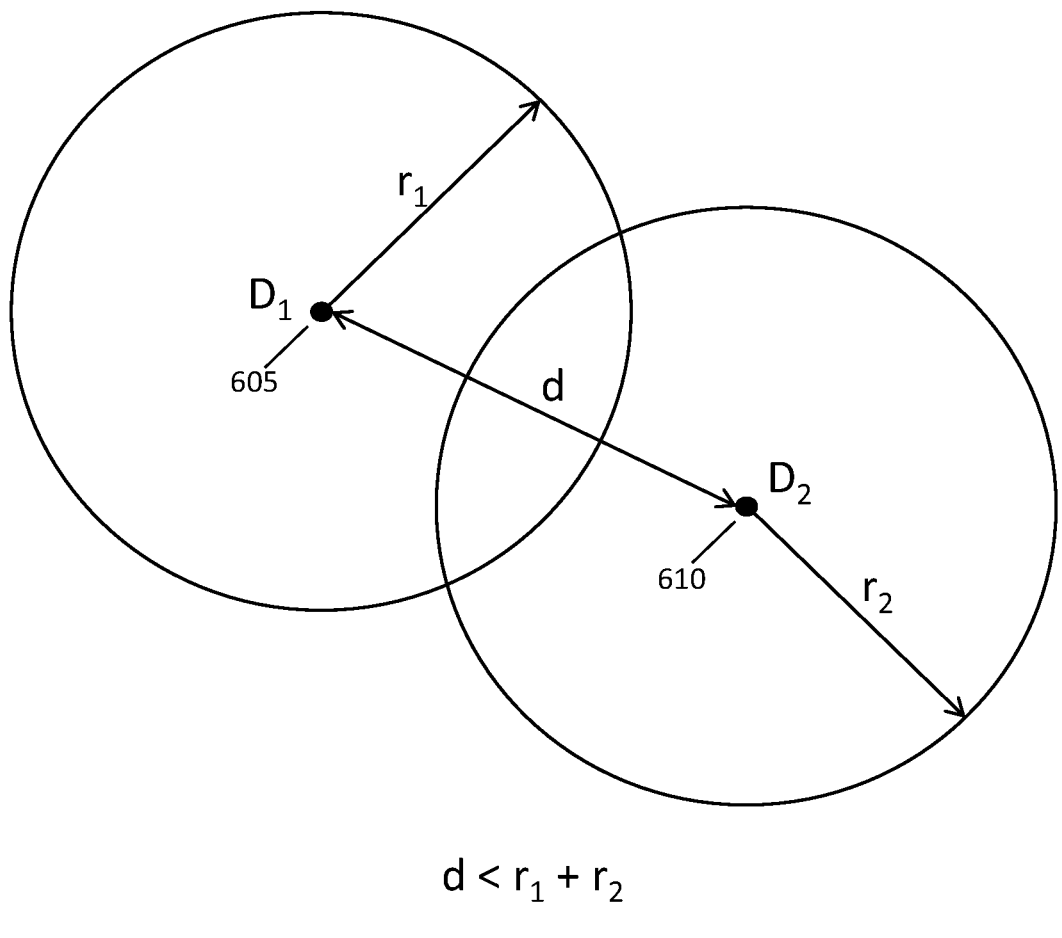
FIG. 6 shows overlapping position uncertainty radii for mobile devices, $D_1$ and $D_2$.

FIG. 6 shows overlapping position uncertainty radii for mobile devices, $D_1$ 605 and $D_2$ 610. In FIG. 6, device $D_1$ has a position uncertainty represented by radius $r_1$ and device $D_2$ has a position uncertainty represented by radius $r_2$. The actual distance between the two devices is d, and $d<r_1+r_2$. Given position estimates and uncertainties devices $D_1$ and $D_2$ one may establish criteria for deciding whether or not they are at "the same place". One has high, but not complete, confidence that the devices are collocated when d=0.

Figure 7:
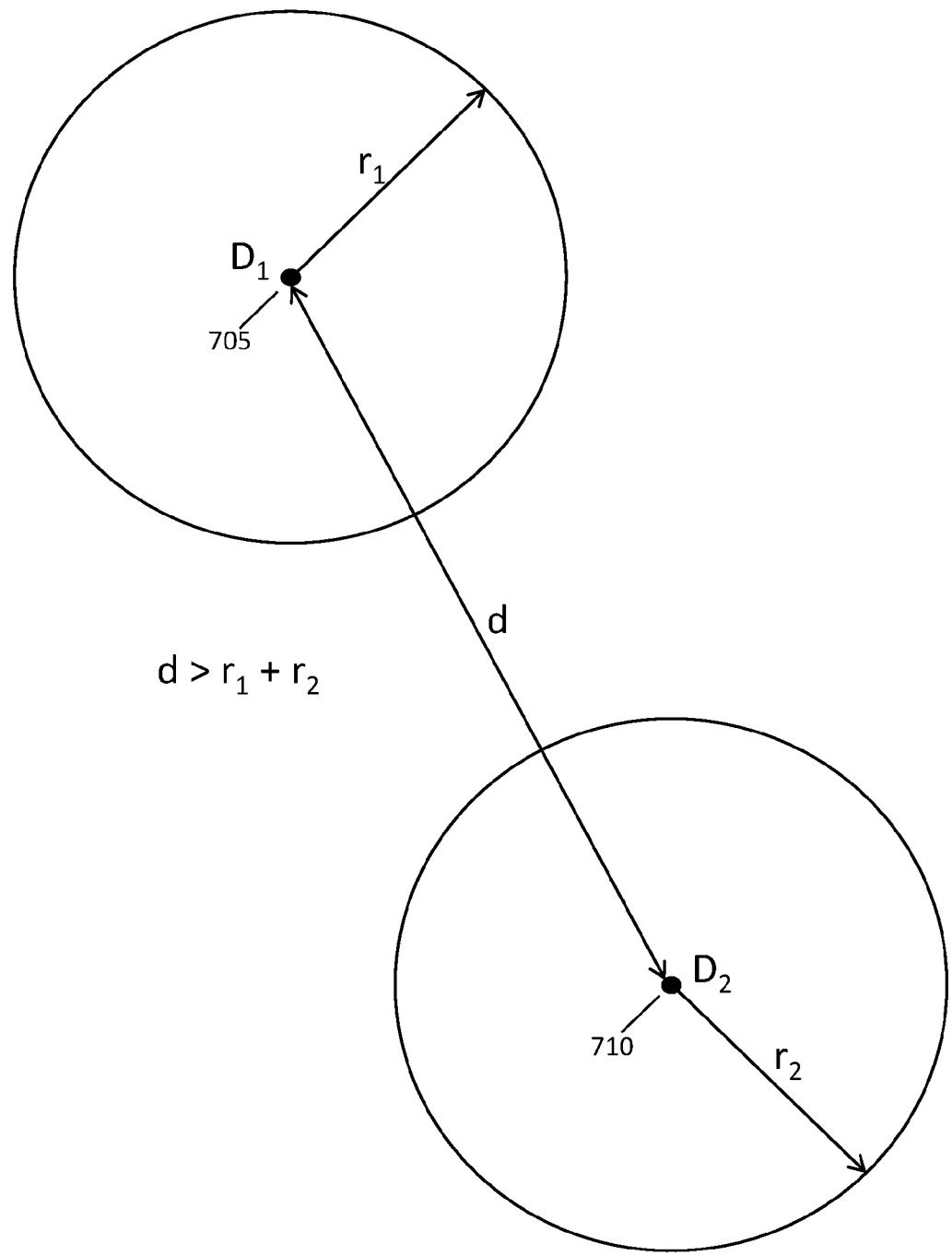
FIG. 7 shows non-overlapping position uncertainty radii for mobile devices, $D_1$ and $D_2$.

FIG. 7 shows non-overlapping position uncertainty radii for mobile devices, $D_1$ 705 and $D_2$ 710. In FIG. 7, device $D_1$ has a position uncertainty represented by radius $r_1$ and device $D_2$ has a position uncertainty represented by radius $r_2$. The actual distance between the two devices is d, and $d>r_1+r_2$. Despite the fact that the circles of position uncertainty shown in FIG. 7 do not overlap, devices $D_1$ and $D_2$ may still be considered at "the same place" for some applications. For example, FIG. 8 shows bump validation in a sparsely populated area.

Figure 8:
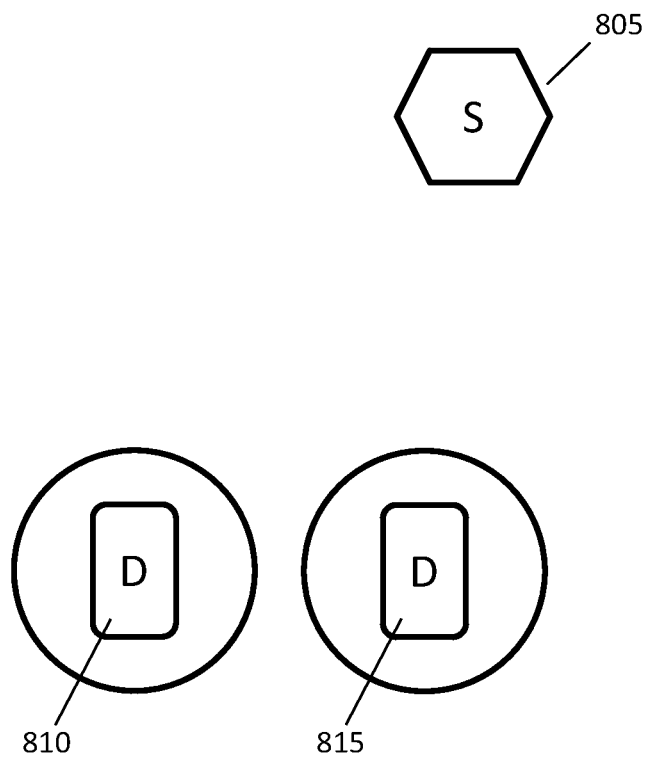
FIG. 8 shows bump validation in a sparsely populated area.

In FIG. 8, server S 805 communicates with devices 810 and 815. Circles drawn around the devices represent position uncertainty radii. Suppose that devices 810 and 815 send status reports to server S and that the status reports indicate the same time, positive requests, but different positions. The position uncertainty radii of devices 810 and 815 do not overlap; i.e. they have the relationship shown in FIG. 7. Should server S 805 validate a bump between devices 810 and 815? Surprisingly, the answer may be "yes" if no other devices are nearby. Thus whether or not two devices are considered to be in "the same place" may be affected by the presence or absence of other devices.

Figure 9:
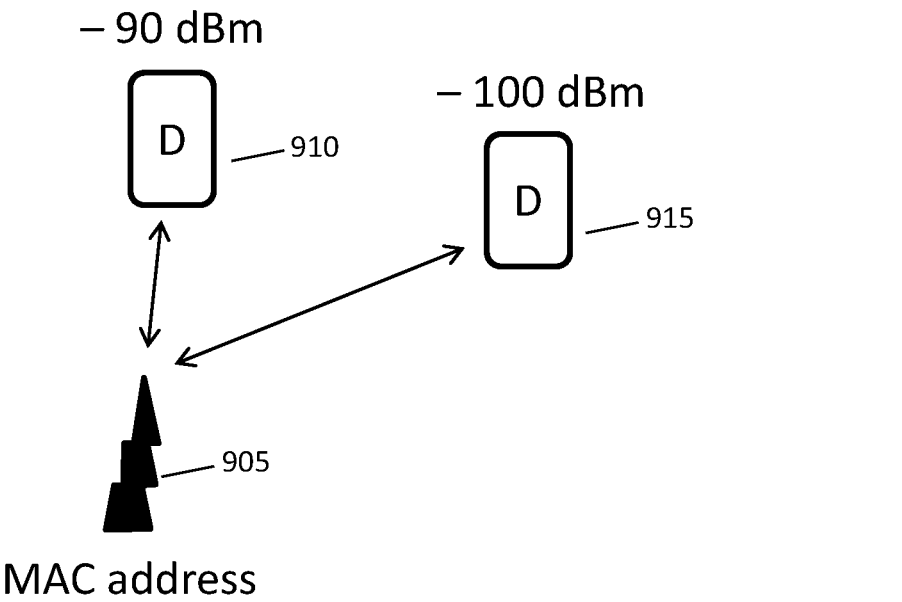
FIG. 9 illustrates determining co-location by radio signal ID or signal strength.
Figure 9:
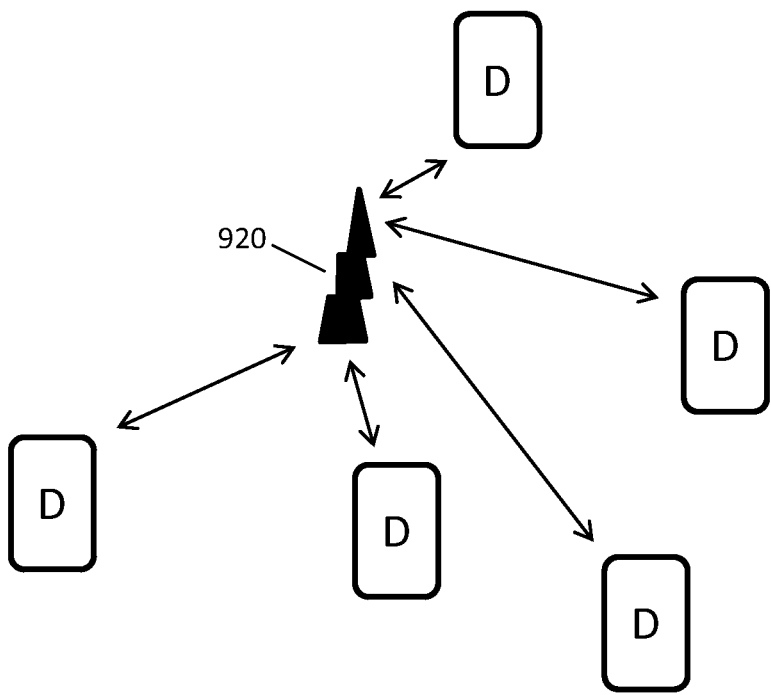

FIG. 9 illustrates determining collocation by radio signal ID or signal strength. In FIG. 9, devices 910 and 915 receive signals from radio station 905 (e.g. cellular radio tower, WiFi node, Bluetooth transceiver, etc.). Radio station 905 is identified by a media access control (MAC) address. The received signal strengths at devices 910 and 915 are −90 dBm and −100 dBm respectively. Five other devices, each labeled "D", receive signals from radio station 920 as shown in the figure.

In some cases devices may be considered collocated if they are both within range of a radio signal having a certain identifying characteristic, such as a MAC address or other identification. In some cases devices may considered collocated if they are connected to the same WiFi node. In other cases devices may be considered collocated if they receive a common radio station with similar received signal strengths or with received signal strength greater than a threshold value.

Clearly, there are many considerations for determining when devices are in "the same place"; i.e. collocated. These considerations may include how position information is obtained, how it is used, and the type of information to be transferred between devices in the event of a valid bump.

Let us turn now to the meaning of "the same time" in the context of bump validation. At first we will make the simplifying assumption that devices report times accurately. As we will see later, this assumption is often incorrect as device clocks may be offset from the true time. Status reports are considered to exist when sent. Any delay between creating a report in a device and sending it from the device is treated as if it were part of the overall transmission delay between device and server.

Figure 10:
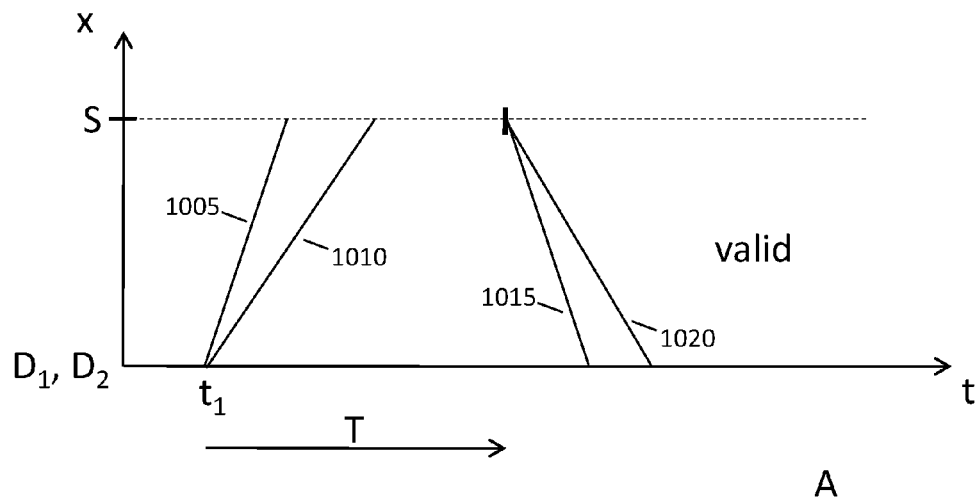
FIG. 10 illustrates bump validation via a timeout period, T.
Figure 10:
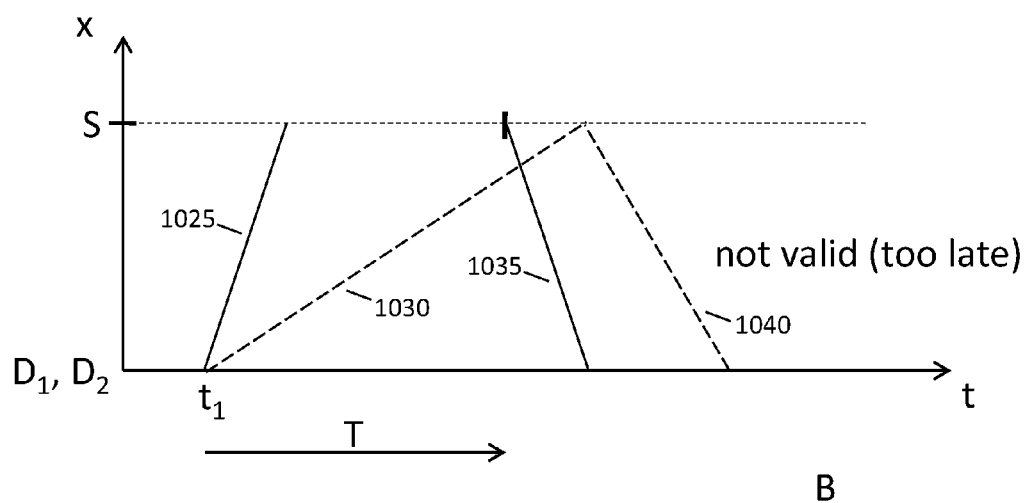

Given two devices that issue status reports from the same place, at the same time, and both with positive requests, when should a server validate (or invalidate) a bump between the two devices? Let us consider four scenarios:

1. Validate if reports are received within a time out period.
2. Validate immediately upon receiving report from second device if no other devices are nearby.
3. Validate after all other nearby devices report with negative requests.
4. If one device sends a status report with a positive request, but all nearby devices report with negative requests, then bump not valid FIG. 10 illustrates bump validation via a timeout period, T. FIG. 10A illustrates a scenario in which reports are received within a timeout period and a bump is validated; FIG. 10B illustrates a scenario in which a report is received after a timeout period and a bump is not validated.

FIGS. 10A and 10B show graphs with position ("x") and time ("t") axes. In FIG. 10A status reports are sent from devices $D_1$ and $D_2$ to server S at time $t_1$. The reports are represented by lines 1005 and 1010. Intersection of these lines with the server's x coordinate (shown as a dashed line in the figure) indicates the time at which the reports are received by the server. In FIG. 10A status report 1005 arrives at the server before status report 1010 even though both reports were sent from the devices simultaneously at time $t_1$. Different reports take different times to travel from device to server.

In FIG. 10A, both reports 1005 and 1010 arrive at server S before timeout period T has expired. The beginning of the timeout period is the time, $t_1$, at which the reports were sent from the devices. At time $t_1+T$ the server sends messages 1015 and 1020 to the devices to inform them that the bump has been validated.

In FIG. 10B, status reports are sent from devices $D_1$ and $D_2$ to server S at time $t_1$. The reports are represented by lines 1025 and 1030. In FIG. 10B status report 1025 arrives at the server before timeout period T expires at $t_1+T$ while status report 1030 arrives at the server after time the timeout period expires. Report 1030 arrives too late and therefore server S sends messages 1035 and 1040 to the devices to inform them that the bump is not valid.

Before turning to the second of the four bump validation scenarios mentioned above, we now consider periodic communications between a server and a mobile device. As we shall see, these periodic communications are useful in validation scenarios two through four. "Periodic communications" include status reports with negative requests; they occur from time to time and the interval between periodic communications may vary. Periodic communications serve at least two purposes: determining which devices may affect bump validation and determining clock offsets. As an example, if a device has not communicated with a server for a long time (e.g. more than eight seconds), then that device should not affect validation of bumps between other devices. The duration of this time-out period may vary depending on the quality of available position estimates and/or the bump application. Periodic communications may include position reports or messages indicating that a device's position has not changed since its last position report.

Figure 11:
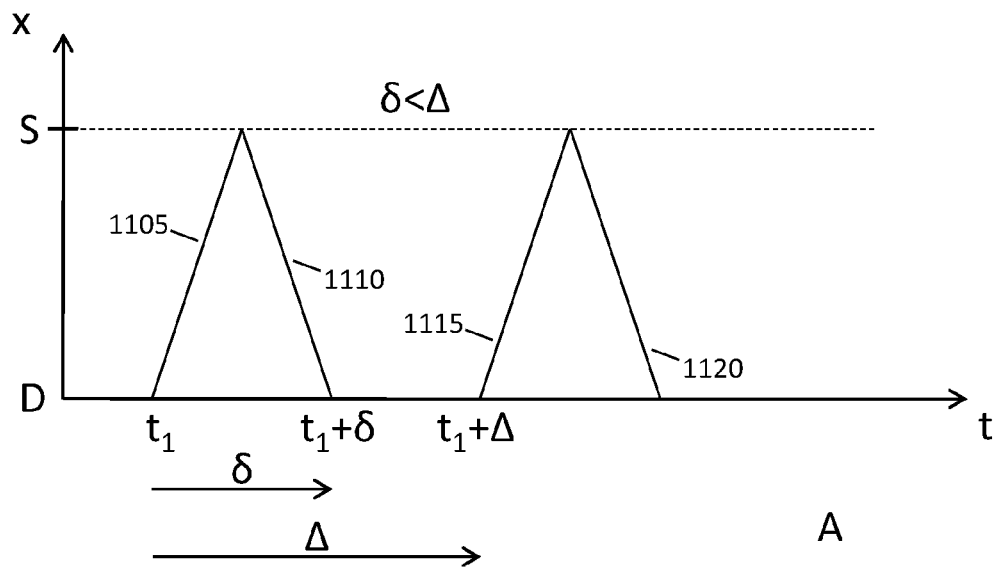
FIG. 11 illustrates periodic communication with a server on fast (A) and slow (B) networks; device pings server.
Figure 11:
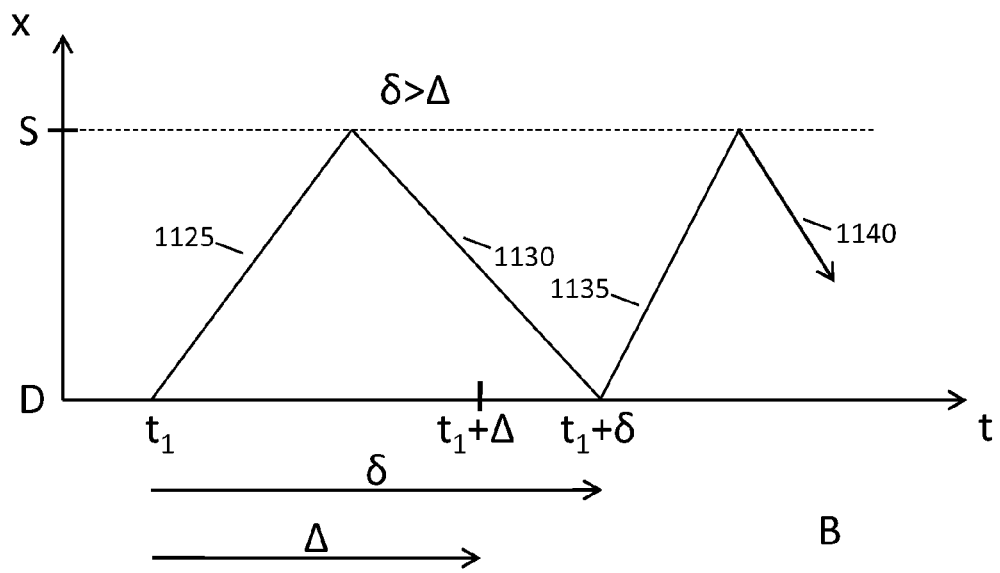

FIG. 11 illustrates periodic communication with a server on fast (A) and slow (B) networks; in FIG. 11 the device "pings" the server; i.e. the device originates periodic communication with the server.

Similar to FIG. 10, FIGS. 11A and 11B show graphs with position ("x") and time ("t") axes. In FIG. 11A communications originate from device D at times $t_1$ and $t_1+\Delta$ as represented by lines 1105 and 1115. The server S sends return messages 1110 and 1120. Message 1110 arrives at the device at time $t_1+\delta$ where $\delta<\Delta$. The device waits until $t_1+\Delta$ to send another message.

If communications between a device and a server take place over a slow channel, then the device may initiate a new periodic communication whenever it receives a reply from the server. This scenario is shown in FIG. 11B. In FIG. 11B communications originate from device D at times $t_1$ and $t_1+\delta$ as represented by lines 1125 and 1135. The server S sends return messages 1130 and 1140. Message 1130 arrives at the device at time $t_1+\delta$ where $\delta>\Delta$. The device sends a new message to the server immediately upon receipt of an acknowledgement of the previous message.

Figure 12:
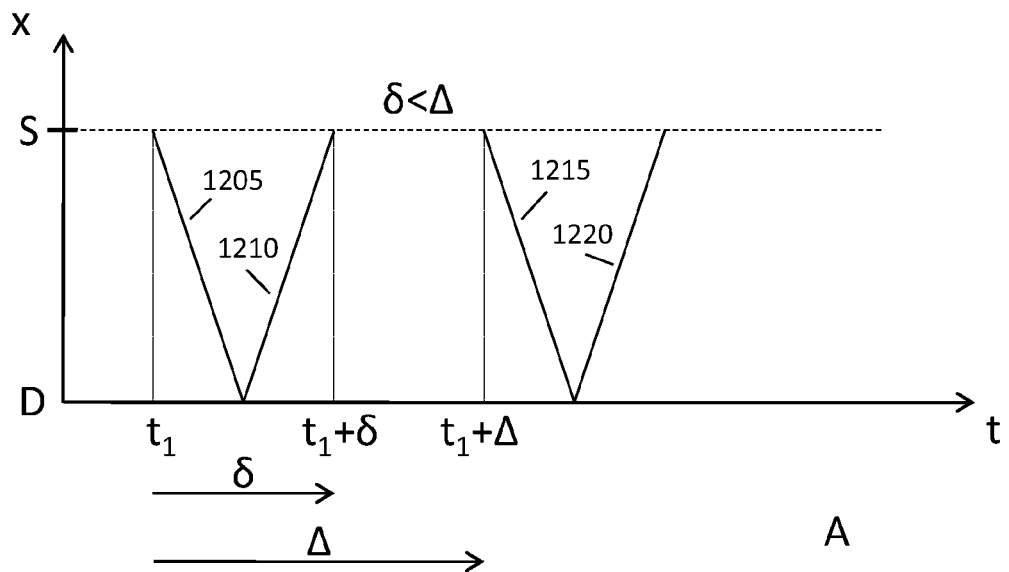
FIG. 12 illustrates periodic communication with a server on fast (A) and slow (B) networks; server pings device.
Figure 12:
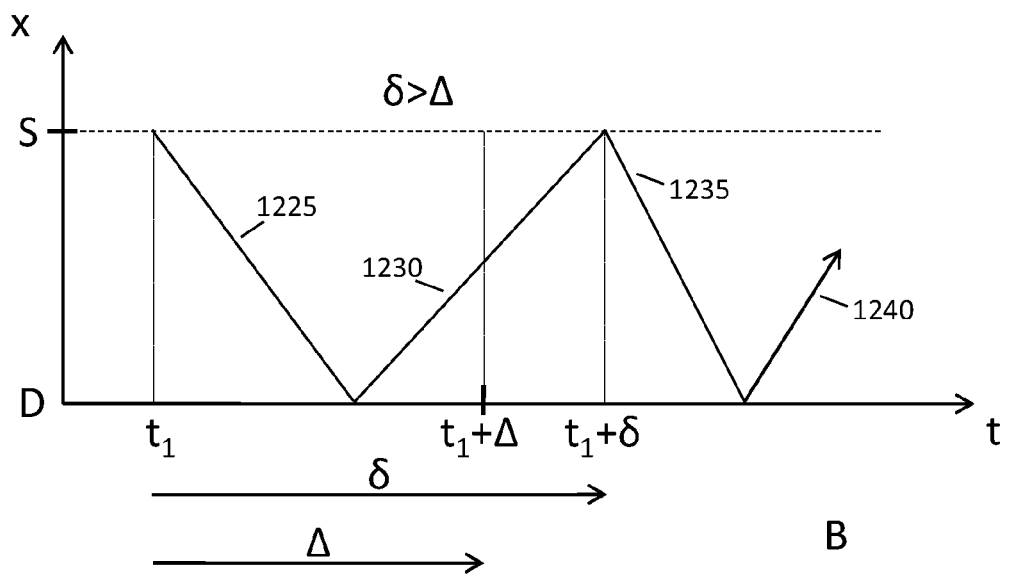

FIG. 12 illustrates periodic communication with a server on fast (A) and slow (B) networks; in FIG. 12 the server "pings" the device; i.e. the server originates periodic communication with the device.

Similar to FIGS. 10 and 11, FIGS. 12A and 12B show graphs with position ("x") and time ("t") axes. In FIG. 12A communications originate from server S at times $t_1$ and $t_1+\Delta$ as represented by lines 1205 and 1215. The device D sends return messages 1210 and 1220. Message 1210 arrives at the server at time $t_1+\delta$ where $\delta<\Delta$. The server waits until $t_1+\Delta$ to send another message.

If communications between a device and a server take place over a slow channel, then the server may initiate a new periodic communication whenever it receives a reply from the device. This scenario is shown in FIG. 12B. In FIG. 12B communications originate from server S at times $t_1$ and $t_1+\delta$ as represented by lines 1225 and 1235. The device sends return messages 1230 and 1240. Message 1230 arrives at the server at time $t_1+\delta$ where $\delta>\Delta$. The server sends a new message to the device immediately upon receipt of an acknowledgement of the previous message.

FIGS. 11 and 12 describe periodic communications between a device and a server in which two-way communication is established. If, however, communication with a device cannot be established (for example, a reply is not received or only received after a long time), then the device becomes irrelevant for purposes of bump validation. A "long time" is normally several minutes.

Figure 13:
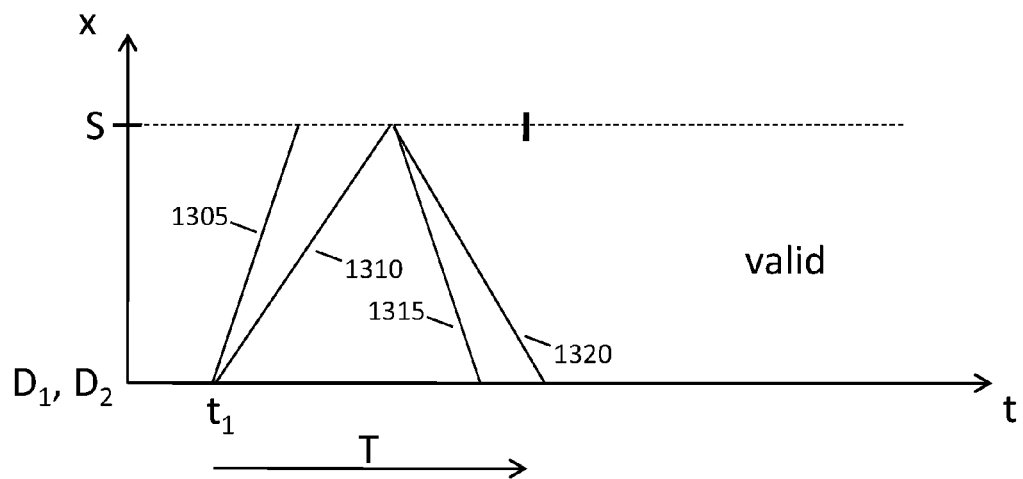
FIG. 13 illustrates bump validation when no other devices are nearby.

Let us return to the second bump validation scenario: "Validate immediately upon receiving report from second device if no other devices are nearby". FIG. 13 illustrates bump validation when no other devices are nearby.

As in FIGS. 10-12, FIG. 13 shows a graph with position ("x") and time ("t") axes. In FIG. 13, devices $D_1$ and $D_2$ send status reports 1305 and 1310 with positive requests to server S at time $t_1$. In FIG. 13 status report 1305 arrives at the server before status report 1310 even though both reports were sent from the devices simultaneously at time $t_1$. Different reports take different times to travel from device to server.

It is instructive to compare FIG. 13 with FIG. 10A. In FIG. 10A, server S waits until time $t_1+T$ to send bump valid messages to devices $D_1$ and $D_2$. In FIG. 13, server S does not wait for time out period T; rather, the server sends bump valid messages 1315 and 1320 to devices $D_1$ and $D_2$ immediately upon receiving report 1310. The server need not wait if no other devices are nearby devices $D_1$ and $D_2$. In this case "other devices" are any devices with which periodic communications have taken place recently (i.e. less than several minutes ago) and "nearby" may be determined according to any of the methods and criteria mentioned above in the discussion of determining a device's position.

Figure 14:
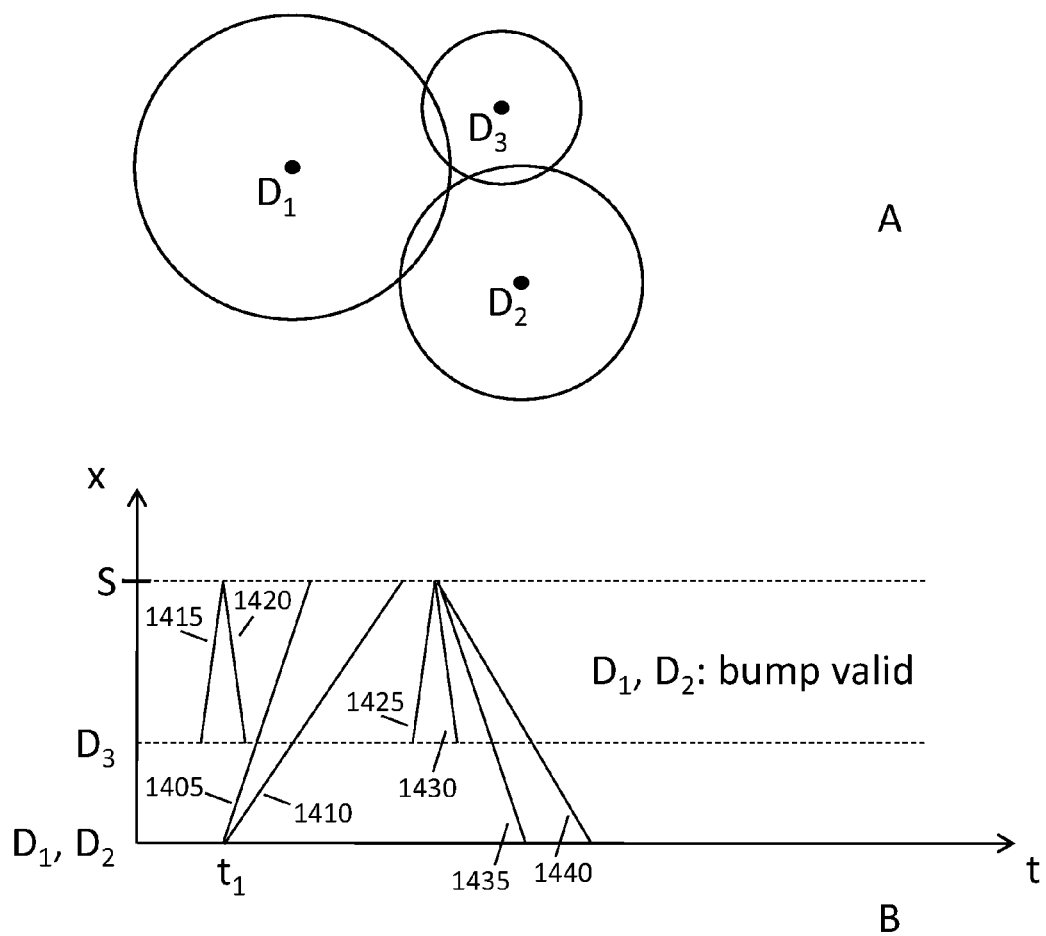
FIG. 14 illustrates bump validation in the presence of other devices.

The third bump validation scenario is: "Validate after all other nearby devices report with negative requests". FIG. 14 illustrates bump validation in the presence of other devices.

FIG. 14A shows three devices, $D_1$, $D_2$ and $D_3$, and their position uncertainty radii. In this example, devices $D_1$ and $D_2$ are in "the same place" and device $D_3$ is "nearby" for purposes of bump validation. No other devices are nearby. FIG. 14B shows a graph with position ("x") and time ("t") axes. The graph illustrates the timing of communications between a server S and devices, $D_1$, $D_2$ and $D_3$. Devices $D_1$ and $D_2$ are shown at the same x coordinate because they are collocated; device $D_3$ is at a different, nearby x coordinate.

In FIG. 14, device $D_3$ sends status report 1415 to the server before time $t_1$. The server sends reply 1420 back to device $D_3$. Devices $D_1$ and $D_2$ send status reports 1405 and 1410 with positive requests to server S at time $t_1$. A short time later, device $D_3$ sends status report 1425 to the server and the server sends reply 1430 back. Status report 1425 contains a negative request.

At this point the server need not wait any longer to validate a bump between devices $D_1$ and $D_2$. Since reports with negative requests have been received from all nearby devices, the server sends bump valid messages 1435 and 1440 to devices $D_1$ and $D_2$. The nearby devices' reports must have been sent after time $t_1$ so that the server can ensure that those devices did not intend to bump. In the scenario of FIG. 14 it is useful if periodic communications with nearby devices (e.g. device $D_3$) occur often. For example, if periodic communications take place approximately once every second, then the server can be assured of hearing from all nearby devices within approximately a second and can validate or invalidate a bump in that time.

Figure 15:
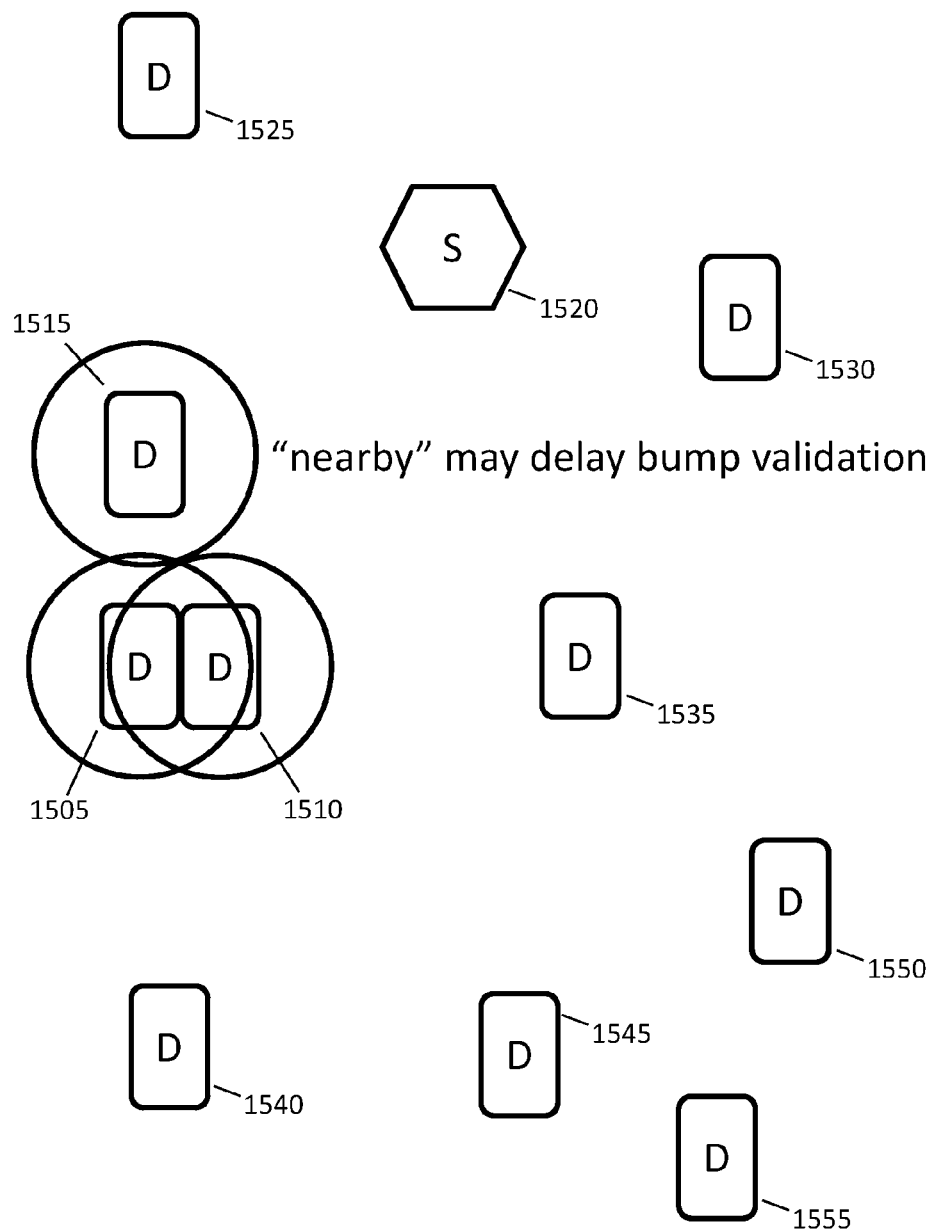
FIG. 15 shows how nearby devices may delay bump validation.

If status report 1425 had contained a positive request, then the server would have sent bump not valid messages to devices $D_1$ and $D_2$. FIG. 15 shows how nearby devices may delay bump validation. In FIG. 15, devices 1505 and 1510 are at the "same place" while device 1515 is "nearby" one or both of them. The devices are in communication with server 1520. Devices 1525, 1530, 1535, 1540, 1545, 1550, and 1555 are also in communication with server 1520 but not nearby 1505 or 1510. As described in connection with FIG. 14, device 1515 may delay validation of a bump between device 1505 and 1510 if it sends a status report with a positive request to server 1520 shortly after devices 1505 and 1510 do. Alternatively periodic reports with negative requests from device 1515 may speed up validation of bumps between devices 1505 and 1510.

The fourth bump validation scenario is: "If one device sends a status report with a positive request, but all nearby devices report with negative requests, then bump not valid". Consider how the example of FIGS. 14 and 15 would change if device $D_2$ or 1510 were not present. If just one device (i.e. $D_1$ or 1505) sends a status report with a positive request to the server, then the server may reply with a "bump not valid" message as soon as all nearby devices send reports with negative requests. The nearby devices' reports must have been sent after time $t_1$ so that the server can ensure that those devices did not intend to bump.

Let us now turn to the problem of clock offsets and remove the assumption that devices report times accurately. Typical devices do not have very accurate clocks and therefore the times that are reported to a server in status reports are often wrong. Furthermore the reports may be delayed between a device and a server.

Figure 16:
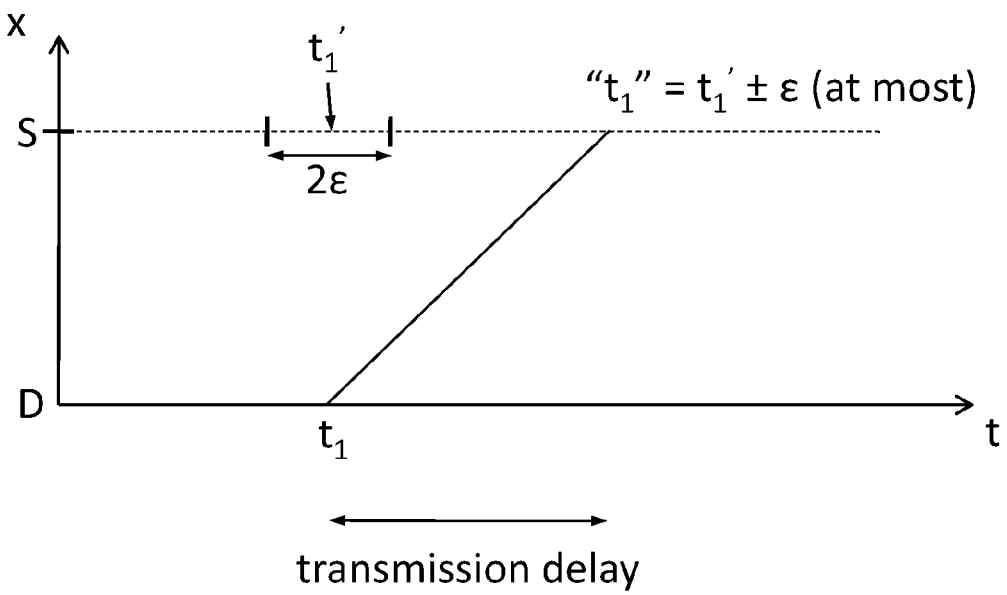
FIG. 16 illustrates clock offset errors.

FIG. 16 illustrates clock offset errors. FIG. 16 shows a graph with position ("x") and time ("t") axes. At what it measures as time $t_1$, device D sends a message to server S. The server receives the message at some later time after a transmission delay. The server interprets time "$t_1$" to mean some time in the range $t_1' \pm \epsilon$. An uncertainty, $\epsilon$, is one way to characterize offsets between device and server clocks. The server determines the offsets between its clock and each device's clock to compare times reported by various devices.

Figure 17:
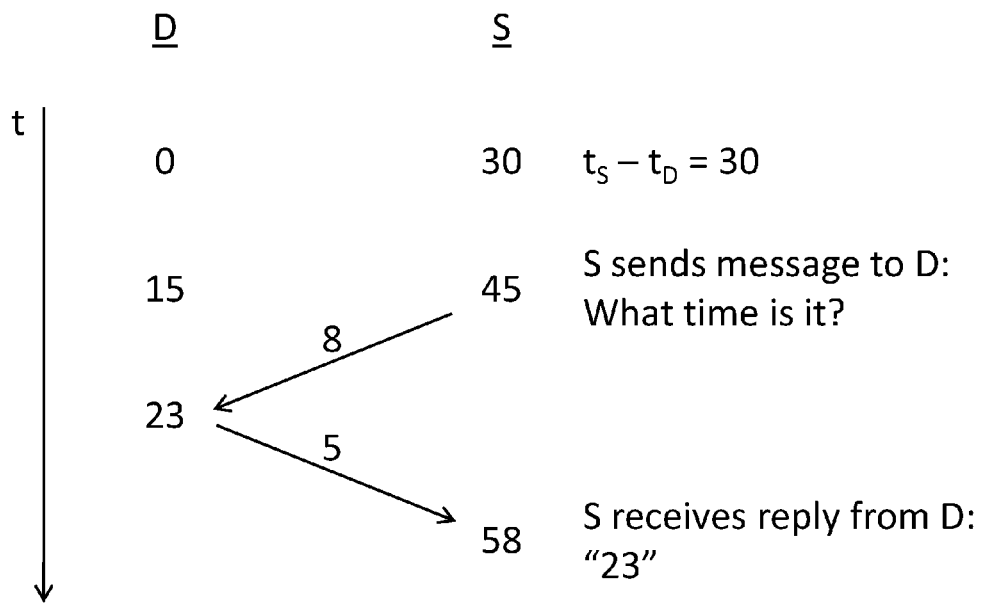
FIG. 17 illustrates a method for clock offset determination (part 1).
Figure 18:
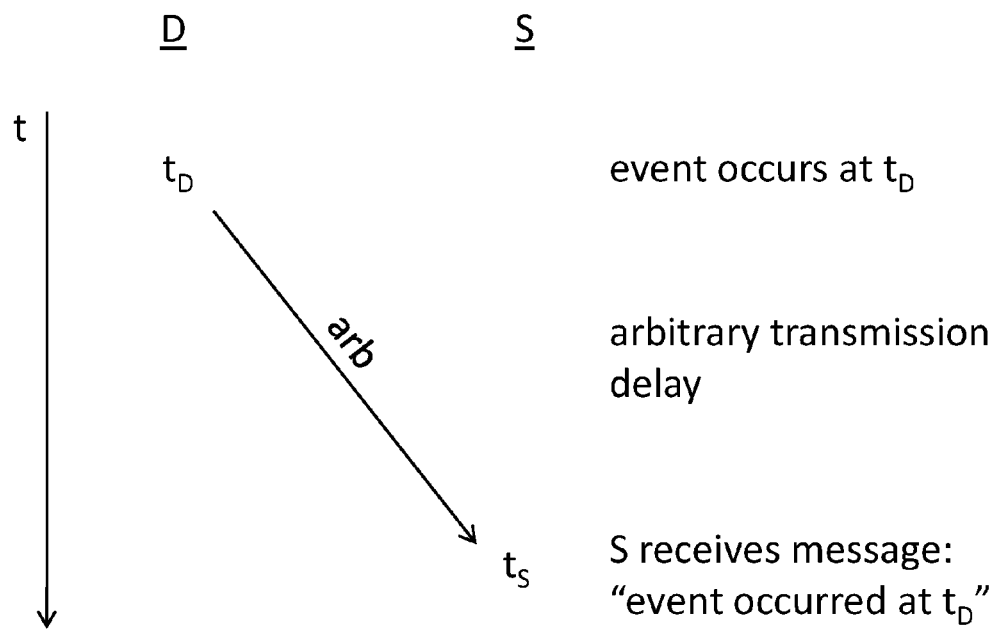
FIG. 18 illustrates a method for clock offset determination (part 2).

FIGS. 17 and 18 show by example a method for clock offset determination. In FIG. 17, device D's clock reads "0" when server S's clock reads "30"; therefore the server's clock is 30 time units ahead of the device's clock. At server time 45 (device time 15) the server sends a message to the device asking "What time is it?" The message takes 8 time units to travel to the device; it reaches the device at device time 23. At device time 23, the device sends a reply to the server ("the time is 23") which takes 5 time units before it reaches the server at server time 58. As a result of this exchange, the server may now determine that device time 23 corresponds to a server time in the range [45, 58]. Continuing this example in FIG. 18, suppose that device D now sends a message to server S reporting an event at device time $t_D$. The message arrives at the server after an arbitrary transmission delay at server time $t_S$. Using the results of FIG. 17, the server knows that an event reported as occurring at $t_D$ (in device time) occurred within a range $[t_D+22, t_D+35]$ in server time. Comparing this result to the diagram in FIG. 16 we see that device time "$t_1$" in FIG. 16 may be represented in server time as a balanced range $[t_1'-\epsilon, t_1'+\epsilon]$ or an unbalanced range $[t_1-\epsilon_1, t_1+\epsilon_2]$. The choice of notation is purely a matter of convenience. A roundtrip exchange of messages between a server and a device is sufficient to determine clock offset between the two. In practice, the offset between device and server clocks changes slowly and is often constant over a period of roughly a few minutes.

Figure 19:
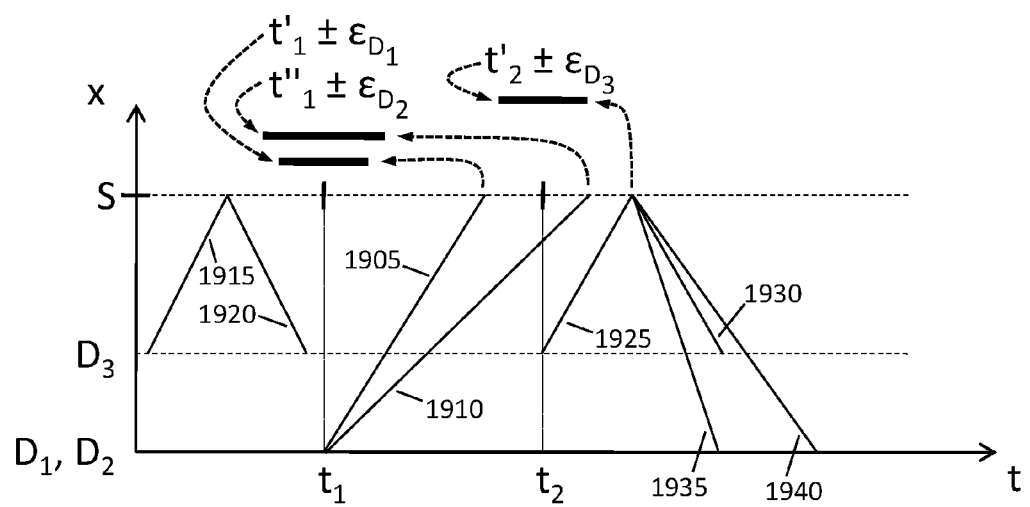
FIG. 19 illustrates bump validation in the presence of other devices with clock uncertainty.

Let us reconsider FIG. 14, now taking clock offsets into account using balanced offset notation $([t_1'-\epsilon, t_1'+\epsilon])$. FIG. 19 illustrates bump validation in the presence of other devices with clock uncertainty.

FIG. 19 shows a graph with position ("x") and time ("t") axes. The graph illustrates the timing of communications between a server S and devices, $D_1$, $D_2$ and $D_3$. Devices $D_1$ and $D_2$ are shown at the same x coordinate because they are collocated; device $D_3$ is at a different, nearby x coordinate.

In FIG. 19, device $D_3$ sends status report 1915 to the server before time $t_1$. The server sends reply 1920 back to device $D_3$. Devices $D_1$ and $D_2$ send status reports 1905 and 1910 with positive requests to server S at time $t_1$. The server considers that the report from device $D_1$ was sent sometime in the range $t_1' \pm \epsilon_{D1}$ and that the report from device $D_2$ was sent sometime in the range $t_1' \pm \epsilon_{D2}$. Ranges $t_1' \pm \epsilon_{D1}$ and $t_1' \pm \epsilon_{D2}$ overlap so the server considers that the reports from $D_1$ and $D_2$ occurred at the "same time". Said another way, the reports are "coincident".

Device $D_3$ sends status report 1925 to the server at time $t_2$. The server considers that the report from device $D_3$ was sent sometime in the range $t_2' \pm \epsilon_{D3}$. The server sends reply 1930 back. Status report 1925 contains a negative request. The range $t_2' \pm \epsilon_{D3}$ does not overlap with either range $t_1' \pm \epsilon_{D1}$ or $t_1' \pm \epsilon_{D2}$; time $t_2$ is therefore later than $t_1$. Therefore, immediately upon receiving report 1925, the server can send bump valid messages 1935 and 1940 to devices $D_1$ and $D_2$.

The example of FIG. 19 is the same as that of FIG. 14 with the introduction of clock offsets. For purposes of bump validation, the server considers reported times as ranges, rather than instantaneous events. One reported time range is considered different from another if the two do not overlap.

Figure 20:
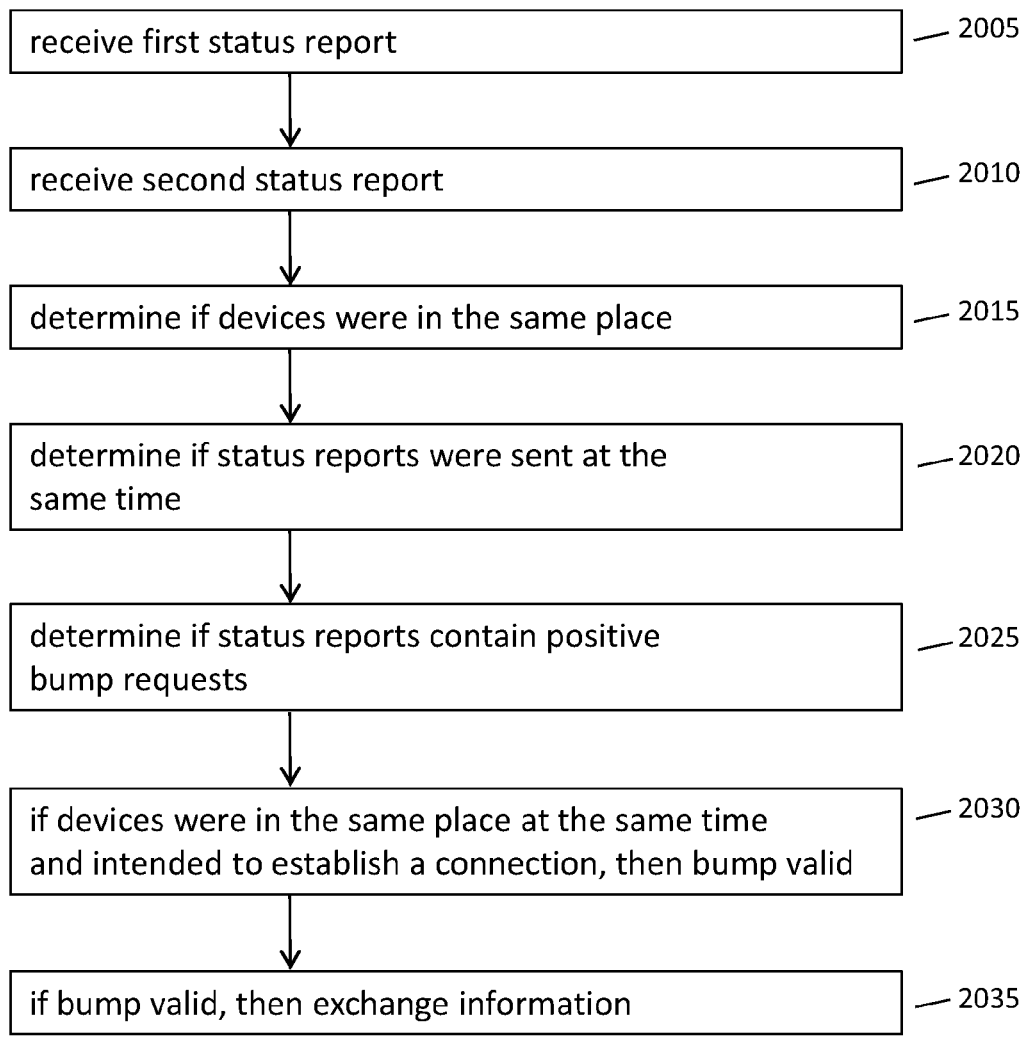
FIG. 20 is a bump validation flow chart.

Now that the concepts of "same time" and "same place" have been discussed, let us return to the original concept of validating or invalidating bumps. FIG. 20 is a flow chart showing an overview of the process of bump validation. In FIG. 20, step 2005 is "receive first status report"; step 2010 is "receive second status report"; step 2015 is "determine if devices were in the same place"; step 2020 is "determine if status reports were sent at the same time"; step 2025 is "determine if reports contain positive requests"; step 2030 is "if devices were in the same place at the same time, and intended to establish a connection, then bump valid"; and, step 2035 is "if bump valid, then exchange information".

As we have seen, efficient and accurate bump validation is a necessary part of a simple and quick way to exchange information between electronic devices when they physically meet each other.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for bump validation comprising:
    receiving a first status report from a first device, wherein the first status report includes a first location and a first radius of uncertainty associated with the first location;
    receiving a second status report from a second device, wherein the second status report includes a second location and a second radius of uncertainty associated with the second location;
    determining whether the first and second status reports were received within a predetermined time from the time that the first status report was sent;
    determining whether the first device and the second device are co-located based on the first and second locations and the first and second radii of uncertainties; and
    in response to determining that the first and second status reports were received within a predetermined time from the time that the first status report was sent and that the first and second devices are co-located, sending a "bump valid" signal to the first device and the second device.

2. The method of claim 1 further comprising:
    sending a "bump not valid" signal to the first device and the second device if either the first status report or the second status report is received after the predetermined time from the time that the first status report was sent.

3. The method of claim 1 wherein the second device is located at the same place as the first device if the devices are both within range of the same wireless network node.

4. The method of claim 1 wherein the second device is located at the same place as the first device if the devices both receive the same radio signal with received signal strengths differing by no more than a predetermined ratio.

5. A method for bump validation comprising:
    receiving a first status report from a first device;
    receiving a second status report from a second device;
    determining if the first and second devices are co-located based on the first and second status reports, wherein the first and second devices are co-located if both of the devices receive the same radio signal with received signal strengths differing by no more than a predetermined ratio;
    periodically receiving status reports from one or more other devices; and
    in response to determining that the first and second status reports were received within a predetermined time window, the first and second devices are co-located, and none of the one or more other devices is nearby the first device, sending a "bump valid" signal to the first device and the second device after receiving the second status report.

6. The method of claim 5 wherein the second device is co-located with the first device if an estimated distance between the first and second devices, based on device positions included in the first and second status reports and estimated uncertainties in the positions, is less than a predetermined distance.

7. The method of claim 5 wherein the second device is co-located with the first device if the devices are both within range of the same wireless network node.

8. The method of claim 5 wherein the one or more other devices are nearby the first device if an estimated distance between the first device and any of the one or more other devices is less than a predetermined distance.

9. The method of claim 5 wherein the one or more other devices are nearby the first device if the first device and any of the one or more other devices are both within range of the same wireless network node.

10. The method of claim 5 wherein the one or more other devices are nearby the first device if the first device and any of the one or more other devices both receive the same radio signal with received signal strengths differing by no more than a predetermined ratio.

11. A method for bump validation comprising:
    receiving a first status report from a first device;
    receiving a second status report from a second device located at the same place as the first device;
    periodically receiving status reports from one or more other devices; and,
    if the first and second status reports were sent at the same time and,
    if one or more other devices is nearby the first device, then,
    sending a "bump valid" signal to the first device and the second device after receiving status report(s) that contain negative requests, and that were sent after the first and second status reports, from each of the one or more other devices that is nearby either the first or second device.

12. The method of claim 11 further comprising:
if one or more other devices is nearby the first device, then,
sending a "bump not valid" signal to the first device and the second device after receiving a status report that contains a positive request, and that was sent after the first and second status reports, from any of the one or more other devices that is nearby either the first or second device.

13. The method of claim 11 wherein the second device is located at the same place as the first device if an estimated distance between the first and second devices, based on device positions included in the first and second status reports and estimated uncertainties in the positions, is less than a predetermined distance.

14. The method of claim 11 wherein the second device is located at the same place as the first device if the devices are both within range of the same wireless network node.

15. The method of claim 11 wherein the second device is located at the same place as the first device if the devices both receive the same radio signal with received signal strengths differing by no more than a predetermined ratio.

16. The method of claim 11 wherein the one or more other devices are nearby the first device if an estimated distance between the first device and any of the one or more other devices is less than a predetermined distance.

17. The method of claim 11 wherein the one or more other devices are nearby the first device if the first device and any of the one or more other devices are both within range of the same wireless network node.

18. The method of claim 11 wherein the one or more other devices are nearby the first device if the first device and any of the one or more other devices both receive the same radio signal with received signal strengths differing by no more than a predetermined ratio.

19. A method for bump validation comprising:
receiving a first status report from a first device;
periodically receiving status reports from one or more other devices; and,
if one or more other devices is nearby the first device, then,
sending a "bump not valid" signal to the first device after receiving status report(s) that contain negative requests, and that were sent after the first status report, from each of the one or more other devices that is nearby the first device, wherein the one or more other devices are nearby the first device if the first device and any of the one or more other devices both receive the same radio signal with received signal strengths differing by no more than a predetermined ratio.

20. The method of claim 19 wherein the one or more other devices are nearby the first device if an estimated distance between the first device and any of the one or more other devices is less than a predetermined distance.

21. The method of claim 19 wherein the one or more other devices are nearby the first device if the first device and any of the one or more other devices are both within range of the same wireless network node.

22. Method for establishing communication between devices comprising:
receiving a first status report from a first device, wherein the first status report includes a first location and a first radius of uncertainty associated with the first location;
receiving a second status report from a second device, wherein the second status report includes a second location and a second radius of uncertainty associated with the second location;
based on the status reports, determining:
if the devices were in the same place based on the first and second locations and the first and second radii of uncertainties,
if the reports were sent at the same time,
if the reports contain positive requests; and,
if the devices were in the same place at the same time and intended to establish a connection, then,
sending a "bump valid" message to the first and second devices.

* * * * *